United States Patent
Koeppe, Jr.

(10) Patent No.: US 6,817,453 B2
(45) Date of Patent: Nov. 16, 2004

(54) REMOTE BRAKE RELEASE WITH CLUTCH

(75) Inventor: Robert J. Koeppe, Jr., Sparta, NJ (US)

(73) Assignee: Inventio AG, Hergiswil (CH)

( * ) Notice: Subject to any disclaimer, the term of this patent is extended or adjusted under 35 U.S.C. 154(b) by 146 days.

(21) Appl. No.: 09/888,934

(22) Filed: Jun. 25, 2001

(65) Prior Publication Data

US 2002/0194944 A1 Dec. 26, 2002

(51) Int. Cl.⁷ ............................................. B60T 13/04
(52) U.S. Cl. ..................... 188/171; 188/156; 188/163; 188/173; 188/158; 192/84.81
(58) Field of Search ................................. 188/161, 163, 188/180, 188, 189, 171, 173, 156, 158, 44, 72.1, 72.2, 72.3; 187/288, 287, 263, 350, 373, 351, 359, 250; 192/12 R, 188, 12 BA, 84.81, 81 C

(56) References Cited

U.S. PATENT DOCUMENTS

| | | | |
|---|---|---|---|
| 1,309,648 A | | 7/1919 | McSherry |
| 3,966,027 A | * | 6/1976 | Plitzkow ..................... 188/182 |
| 4,410,074 A | * | 10/1983 | Maucher et al. ........... 192/48.7 |
| 4,875,558 A | * | 10/1989 | Berkhan et al. ............ 188/171 |
| 4,923,055 A | * | 5/1990 | Holland ....................... 187/287 |
| 4,977,982 A | * | 12/1990 | Bialy et al. ................. 187/350 |
| 5,002,158 A | * | 3/1991 | Ericson et al. .............. 187/254 |
| 5,007,505 A | * | 4/1991 | Lindegger .................... 187/254 |
| 5,020,640 A | * | 6/1991 | Nederbragt .................. 187/288 |
| 5,022,505 A | * | 6/1991 | Io .......................... 192/12 BA |
| 5,083,634 A | * | 1/1992 | Yonemoto .................... 187/277 |
| 5,197,802 A | * | 3/1993 | Miller et al. ................ 366/217 |
| 5,202,539 A | * | 4/1993 | Lamb ........................... 187/254 |
| 5,310,022 A | * | 5/1994 | Sheridan et al. ............ 187/305 |
| 5,526,902 A | | 6/1996 | Gausachs et al. ........... 187/263 |
| 5,680,911 A | | 10/1997 | Wang .......................... 187/263 |
| 5,819,876 A | * | 10/1998 | Chao ........................... 187/263 |
| 5,971,109 A | | 10/1999 | Aulanko et al. ............. 187/263 |
| 6,015,958 A | * | 1/2000 | Pomatto et al. ............. 200/330 |
| 6,179,090 B1 | * | 1/2001 | Casas ........................... 187/377 |
| 6,273,216 B1 | * | 8/2001 | Kocher et al. ............... 187/377 |

FOREIGN PATENT DOCUMENTS

DE   197 54 034   6/1999

* cited by examiner

Primary Examiner—Matthew C. Graham
Assistant Examiner—Mariano Sy
(74) Attorney, Agent, or Firm—MacMillan, Sobanski & Todd, LLC

(57) ABSTRACT

A remote brake release for elevator drive machine brakes includes a release lever attached to a shaft coupled by a clutch to a bellcrank. The clutch is normally engaged and can be a spring clutch or a friction type disc clutch. Movement of the lever to rotate the shaft moves the bellcrank which is coupled to a brake release mechanism. A solenoid is actuated to disengage the clutch preventing release of the brake. The solenoid can be connected to a control circuit responsive to a speed of rotation of the drive machine motor.

19 Claims, 2 Drawing Sheets

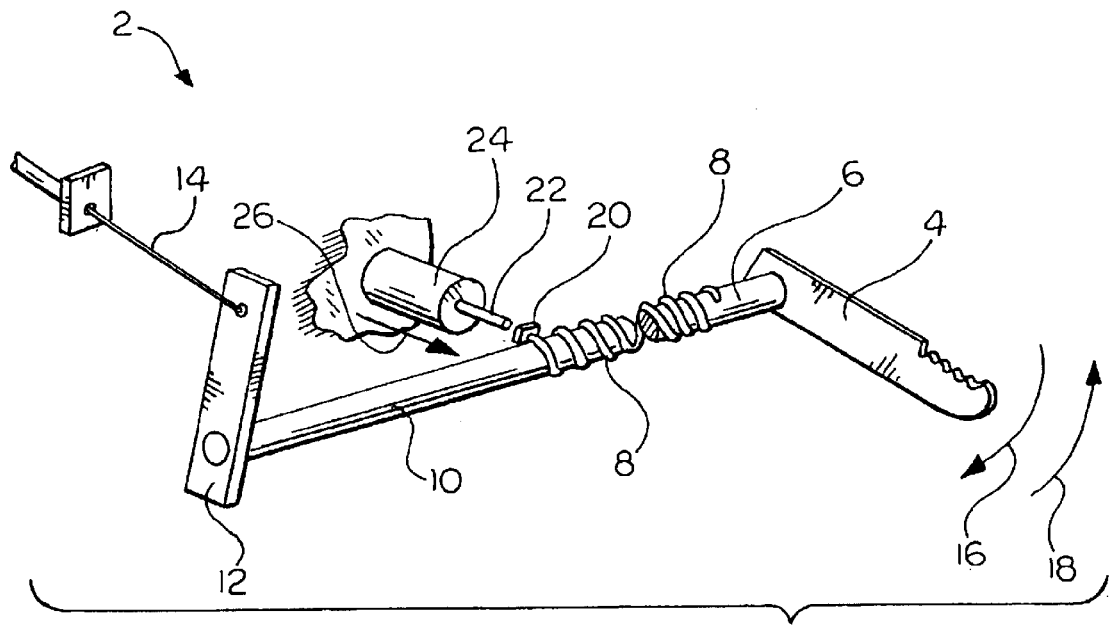
FIG. 1
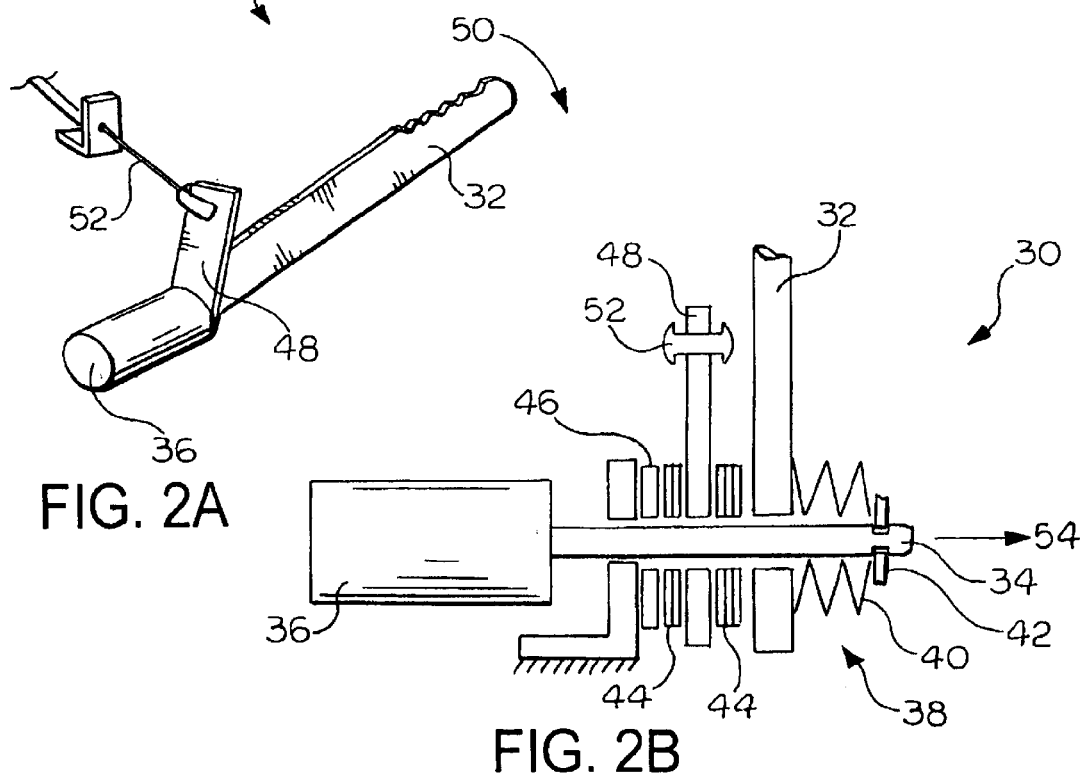
FIG. 2A
FIG. 2B

REMOTE BRAKE RELEASE WITH CLUTCH

BACKGROUND OF THE INVENTION

The present invention relates generally to braking systems for elevators and, in particular, to an elevator remote brake release with a clutch.

Elevators and their associated mechanical components are well known. Elevators are used to move people and things between floors in multistory buildings. A conventional traction type elevator application includes an elevator car attached to a counterweight via a suspension cable, and a drive machine rotating a traction sheave that is engaged with the cable. As the drive turns the sheave, friction forces between the grooved surface of the sheave and the cable cause the car and counterweight to oppositely raise and lower in a hoistway. A brake associated with the drive is used to slow and stop the car. The drive machine and the brake are typically located in a machine room accessible by maintenance personnel. The machine room can be located at the top or the bottom of the hoistway or adjacent to the hoistway.

Elevators are also provided with control systems that perform various functions for ensuring smooth and safe operation of the elevator including operating the drive machine and the brake. Advances in elevator technology have led to the development of mini-machine-room or machine-room-less (MMR/MRL) elevator applications. As their names imply, these types of elevator mechanical systems employ very small machine rooms or no machine rooms at all. MMR/MRL elevator applications have the goal of reducing the amount of building space occupied by the elevator systems and thereby increasing the amount of usable space on the floors, and are becoming more and more common.

The brake is a major component of the electrical mechanical and control systems. The brake is utilized in normal operation for arresting the movement of the elevator car, but also is engaged in emergency situations in order to prevent the car from moving within the hoistway. Brakes typically utilize a spring or clutch mechanism with accompanying wear plates that engage with a drum area on the drive motor, or alternatively with a cylindrical brake drum that is attached to the suspension cable, in order to stop the movement of the elevator car.

Elevators are provided with numerous safety systems in addition to the basic mechanical components and control systems described above. Safety systems generally contain sensors that monitor the condition of the mechanical components or the operation of the control systems. The safety systems are engaged whenever the mechanical components or control systems are operating in a manner to meet or exceed preset limits for safety, and may utilize the brakes to stop the movement of the elevator car. The safety systems may also stop operation, for example by disconnecting power, of the drive and control system, where feasible.

In emergency situations, the brake is typically engaged so that the elevator car remains stationary in the hoistway. When this occurs, the elevator car may be between floor levels. It is desirable to be able to move the car short distances, for example to the adjoining floor, so that any occupants can exit the car safely and/or maintenance personnel can enter the car. The elevator car is moved by overriding the application of the brake using an emergency brake release. In many prior art systems, the emergency brake release could only be activated from the machine room, making the process both time-consuming and inefficient.

It is especially desirable for the brake release to be actuated remotely so that maintenance personnel can actuate the brake release without having to enter the machine room. Furthermore, in MMR/MRL elevator applications the drive machine and the associated brake are not easily accessible. Prior art patents have recognized this desirability. The U.S. Pat. No. 5,526,902 describes a means for utilizing a brake release from inside the elevator car. The U.S. Pat. No. 5,971,109 describes the remote operation of brake release by utilizing linkage from the interior of the car, or alternatively, from another space adjacent to the elevator shaft but remote from the machinery space.

The prior art noted above, however, does not contemplate the fact that an emergency situation may occur or that the elevator car may move too quickly after the brake release has been engaged. For example, an overspeed condition may occur after the brake has been released, and the prior art shows no way to reengage the brake in order to prevent a catastrophic failure or at least an undesirable condition from occurring.

It is desirable to provide a remote brake release that has the ability to be disengaged, and to reengage the elevator brake if an emergency condition, such as an overspeed condition, is detected.

It is an object of the present invention, therefore, to provide a safe and efficient means of remotely releasing a drive machine brake on applications where the drive machine and the brake are not accessible. It is another object of the present invention to increase the safety of the entire elevator application by integrating the brake release mechanism with an overspeed detection system.

SUMMARY OF THE INVENTION

The brake release apparatus according to the present invention provides a safe and efficient means of remotely releasing a drive machine brake on applications where the drive machine and brake are not accessible, which is typical of Machine Room Less (MRL) and Mini Machine Room (MMR) applications. The advantage of this invention over the prior art is that it provides a means of automatically disengaging the remote brake over-ride should an overspeed condition be detected. Once disengaged, the standard return springs on the drive machine brake cause the brake to re-apply thus slowing and stopping the car.

The brake release apparatus according to the present invention includes a solenoid and simple spring clutch to engage or disengage an emergency brake release. A brake release lever is located where it may be accessed by a qualified elevator service technician. Rigidly attached to the brake release lever is a shaft. A spring clutch is fitted around the end of the shaft. A second shaft is also fitted into the spring clutch and is then connected to a bellcrank and from there to a cable. The cable is attached to the brake on the drive machine.

The spring clutch is a simple helical spring made from rectangular spring wire. It is preferably fit to the two shafts with a slight interference fit (approximately 0.1 mm). Pulling down on the brake release causes the brake release lever shaft to rotate. The spring (right hand or left hand) is selected such that pulling down on the brake release lever causes the spring to wind tighter onto the bellcrank shaft thus transmitting torque to the bellcrank. Pushing up on the lever causes the spring to unwind, releasing the spring and preventing torque transmission.

One end of the spring is fastened to the brake release lever shaft. The other end of the spring is free. The free end has a small pad that can be engaged by a solenoid or other similar device. The purpose of this arrangement is that the solenoid can then be used to disengage the clutch should an overspeed condition be detected. It does this by pushing on the pad and unwinding the spring. This clutch and solenoid arrangement is known in the art as a "normally engaged" clutch.

The present invention can be practiced in arrangements other than mechanical actuation of the brake release and electrical actuation upon an overspeed detection. Other arrangements are possible by varying the hand of the spring, the fixation locations (and methods) of the spring to the shafts and the control circuit logic.

In an alternative embodiment, the present invention may also be practiced with a "normally disengaged" device using the same elements. In place of an interference fit, the spring would have a clearance fit to the shaft on the brake release lever. The solenoid would be located on the brake lever side of the spring. To actuate the emergency release, the solenoid would extend and push on the spring tab. This would cause the spring to wind "down" on the brake release shaft. Torque in the shaft would then be transmitted to the brake.

In another alternative embodiment, the present invention makes it possible to eliminate the free rotation that will occur in the brake release lever when the solenoid disengages the clutch. A second spring can be added between the brake lever and ground. This second spring would be "normally disengaged". The solenoid would actuate both springs, causing the spring between the emergency brake lever and the brake to disengage, and causing the spring between the brake release lever and ground to engage.

Finally, the present invention is not limited to the use of spring clutches. A friction type disc clutch could be used instead of the spring clutch.

The present invention advantageously combines an overspeed protection with the brake release mechanism, providing an additional level of safety with the elevator operation and maintenance.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a perspective view of a remote brake release apparatus in accordance with the present invention;

FIG. 2A is a perspective view and FIG. 2B is an elevation view of an alternative embodiment of the remote brake release apparatus in accordance with the present invention.

DESCRIPTION OF THE PREFERRED EMBODIMENTS

Figure 3:
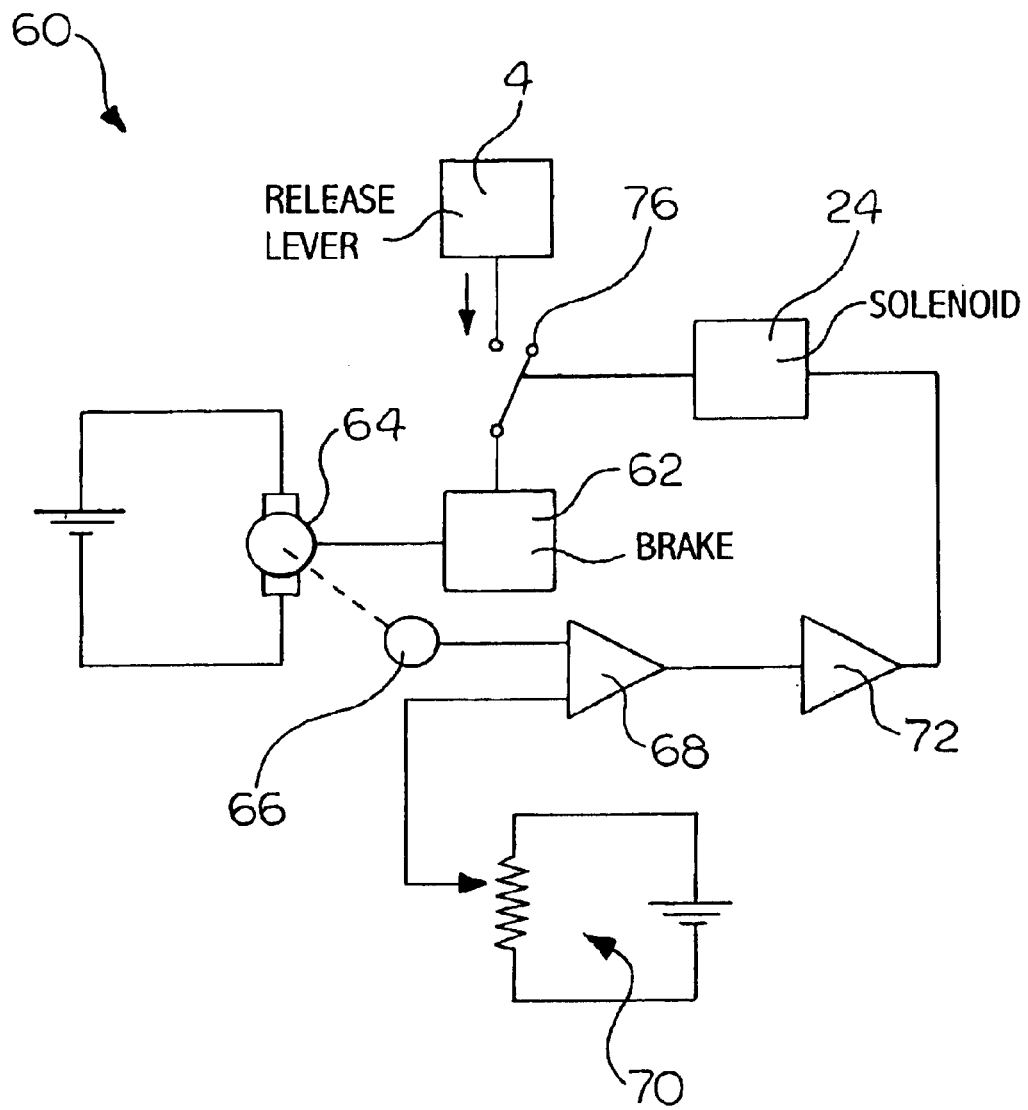
FIG. 3 is a schematic block diagram of a control system for a remote brake release apparatus in accordance with the present invention.

Referring now to FIG. 1, a remote brake release is indicated generally at 2. The brake release 2 is intended to be operated by a qualified elevator service technician. The brake release 2 includes a brake release lever 4 having an end rigidly attached to one end of a first brake release shaft 6 such that the lever extends longitudinally transverse to an axis of the shaft. A spring clutch 8, in the form of a helical spring, is coupled to an opposite free end of the first brake release shaft 6 and to a free end of a second brake release shaft 10. The spring clutch 8 is preferably coupled to the shafts 6 and 10 with a slight interference fit to function as a "normally engaged" clutch. The shafts 6 and 10 are axially aligned. The second brake release shaft 10 has an opposite end rigidly attached to a bellcrank 12 adjacent one end thereof such that the bell crank extends longitudinally transverse to the shaft. A brake releasing means 14, shown here as a cable, is attached adjacent an opposite end of the bellcrank 12.

The spring clutch 8 is constructed so that when the brake release lever 4 is moved in a releasing direction depicted by an arrow 16, the spring clutch 8 tightens around the shafts 6 and 10 so that the torque from the brake release lever 4 is transmitted to the bellcrank 12. Conversely, if the brake release lever 4 is moved in an engaging direction depicted by an arrow 18, the spring clutch 8 loosens from the shafts 6 and 10 so that no torque from the brake release lever 4 is transmitted to the bellcrank 12.

The brake releasing means 14 is preferably a control cable or the like. The brake releasing means 14 is further attached to a drive machine brake (not shown), utilizing the torque transmitted from the brake release lever 4 to release the spring tension of the brake return springs (not shown) on the friction pads (not shown) of the brake.

A pad 20 is attached to an end of the spring clutch 8 engaging the shaft 10. The pad 20 cooperates with a shaft or plunger 22 of a solenoid 24. When a control or safety system (not shown) detects an emergency condition, the control or safety system sends a signal (not shown) to energize the solenoid 24. When the solenoid 24 is energized, the shaft 22 extends in a direction 26 and pushes on the pad 20. By pushing on the pad 20, the shaft 22 unwinds the spring clutch 8, and does not allow torque to be transmitted from the brake release lever 4 to the bellcrank 12 and the brake releasing means 14.

Referring now to FIG. 2A and FIG. 2B, an alternative embodiment of a remote brake release is indicated generally at 30. The remote brake release apparatus 30 includes a brake release lever 32 having an end rigidly attached to one end of a brake release shaft 34 such that the lever extends transverse to the shaft. The brake release shaft 34 can be attached to or form a plunger of a solenoid 36. A friction type disc clutch indicated generally at 38 is mounted on the brake release shaft 34. The clutch 38 includes a spring pack 40, a spring retainer 42, a clutch pack 44 and a thrust washer 46. The clutch pack 44 preferably contains a plurality of friction pads members or the like for gripping a bellcrank 48 that is positioned between the members of the clutch pack 44. The bellcrank 48 has an end with an aperture through which the shaft 34 passes. The spring pack 40 is normally compressed so that the clutch pack 44 is compressed against the bellcrank 48. A movement of the brake release lever 32 in a releasing direction depicted by an arrow 50, therefore, rotates the shaft 34 and the coupled bellcrank 48. An opposite end of the bellcrank 48 is attached to a brake releasing means 52.

The brake releasing means 52 is preferably a control cable or the like. The brake releasing means 52 is further attached to the drive machine brake (not shown), preferably utilizing the torque transmitted from the brake release lever 32 to release the spring tension of the brake return springs (not shown) on the friction pads (not shown) of the brake.

When a control or safety system (not shown) detects an emergency condition, the control or safety system sends a signal (not shown) to energize the solenoid 36. When the solenoid 36 is energized, the shaft 34 moves in an energized direction depicted by an arrow 54. When the shaft 34 moves in the energized direction 54, the spring pack 40 is decompressed and releases its grip on the bellcrank 48. In the released state, torque is not transmitted from the brake release lever 32 to the bellcrank 48 and the brake releasing means 52.

Referring now to FIG. 3, a control system of the remote brake release apparatus according to the present invention is indicated generally at 60. The control system 60 can be used with the remote brake release 2 shown in FIG. 1 and with the remote brake release 30 shown in FIGS. 2A and 2B. A drive machine brake 62 is attached to a drive motor 64. The speed of the drive motor 64 is monitored by an encoder 66, which supplies a voltage signal, in proportion to the speed of the drive motor 64, to one input of a comparator 68. The encoder 66 is preferably a position encoder, a speed encoder or a generator similar to those used on bicycle headlamps. A reference voltage supply 70 supplies a reference voltage to another input of the comparator 68. The comparator 68 compares the signal from the reference voltage supply 70 to the signal from the encoder 66. If the signal from the encoder 66 exceeds a preset value in relation to the reference voltage supply 70, the comparator 68 will provide a signal to an amplifier 72, which is connected to an output of the comparator 68. The amplifier 72 processes the output signal from the comparator 68, and provides a voltage to a solenoid 74 which can be the solenoid 24 or the solenoid 36. The solenoid 74 disengages a clutch 76, which can be the clutch 8 or the clutch 38. The clutch 76 is positioned between a release lever 78, which can be the lever 4 or the lever 32, and the brake 62. The brake 62 is then reengaged and the brake springs (not shown) and friction pads (not shown) then stop the drive motor 64.

In accordance with the provisions of the patent statutes, the present invention has been described in what is considered to represent its preferred embodiment. However, it should be noted that the invention can be practiced otherwise than as specifically illustrated and described without departing from its spirit or scope. For example, the present invention can vary the type of clutch utilized, the type of solenoid utilized, as well as other alternatives of control circuit logic utilized.

What is claimed is:

1. A brake release apparatus for an elevator drive machine brake comprising:
   a release lever;
   a shaft having one end attached to an end of said release lever, said release lever extending longitudinally transverse to an axis of said shaft;
   a bellcrank adapted to be connected to the elevator drive machine brake;
   a brake releasing means connected to said bellcrank for connecting said bellcrank to the drive machine brake, said brake releasing means being a cable;
   a selectively actuatable clutch means coupled between said shaft and said bellcrank, said clutch means having engaged and disengaged positions such that when said clutch means is in the engaged position, a torque applied through said release lever to rotate said shaft moves said bellcrank; and
   an actuating means coupled to said clutch means, said clutch means normally being in the engaged position whereby said actuating means is selectively operable to move said clutch means to the disengaged position to prevent the movement of said bellcrank.

2. The brake release apparatus according to claim 1 including another shaft having one end attached to an end of said bellcrank and wherein said clutch means includes a spring clutch coupling said shafts for co-rotation.

3. The brake release apparatus according to claim 1 wherein said clutch means includes a disc clutch coupling said shaft to said bellcrank.

4. The brake release apparatus according to claim 1 including a control system connected to said actuating means and being responsive to an input signal representing a speed of a drive machine for operating said actuating means to move said clutch means to the disengaged position.

5. The brake release apparatus according to claim 1 wherein said actuating means is a solenoid.

6. A brake release apparatus for an elevator drive machine brake comprising:
   a release lever;
   a shaft having one end attached to an end of said release lever, said release lever extending longitudinally transverse to an axis of said shaft;
   a bellcrank adapted to be connected to the elevator drive machine brake;
   a cable connected to said bellcrank for connecting said bellcrank to the drive machine brake;
   a selectively actuatable clutch means coupled between said shaft and said bellcrank, said clutch means having engaged and disengaged positions such that when said clutch means is in the engaged position, a torque applied through said release lever to rotate said shaft moves said bellcrank; and
   a solenoid coupled to said clutch means, said clutch means normally being in the engaged position whereby said solenoid is selectively operable to move said clutch means to the disengaged position to prevent the movement of said bellcrank.

7. The brake release apparatus according to claim 6 including another shaft having one end attached to an end of said bellcrank and wherein said clutch means includes a spring clutch coupling said shafts for co-rotation.

8. The brake release apparatus according to claim 7 wherein said spring clutch includes a helical spring extending about said shafts and said solenoid includes a plunger acting on an end of said helical spring clutch in a direction tending to unwind said helical spring.

9. The brake release apparatus according to claim 8 including a pad attached to said end of said helical spring for engaging said plunger.

10. The brake release apparatus according to claim 6 wherein said clutch means includes a disc clutch coupling said shaft to said bellcrank.

11. The brake release apparatus according to claim 10 wherein said shaft forms a plunger of said solenoid.

12. The brake release apparatus according to claim 6 including a control system connected to said solenoid and being responsive to an input signal representing a speed of a drive machine for operating said solenoid to move said clutch means to the disengaged position.

13. A brake release apparatus for manually releasing an elevator drive machine brake comprising:
   a manually operated release lever;
   a shaft having one end attached to an end of said release lever, said release lever extending longitudinally transverse to an axis of said shaft;
   a bellcrank;
   an elevator drive machine brake located remotely from said release lever and normally engaged with an elevator drive machine in an emergency situation;

a brake releasing means connected between said bellcrank and said elevator drive machine brake;

a clutch means coupled between said shaft and said bellcrank, said clutch means having a normally engaged position and a disengaged position such that when said clutch means is in the normally engaged position, a torque applied through said release lever to rotate said shaft moves said bellcrank to disengage said elevator drive machine brake from engagement with the elevator drive machine; and an actuating means coupled to said clutch means and being automatically operable to move said clutch means to the disengaged position to prevent the movement of said bellcrank by said release lever and permit said elevator drive machine brake to engage the elevator drive machine.

14. The brake release apparatus according to claim 13 including another shaft having one end attached to an end of said bellcrank and wherein said clutch means includes a spring clutch coupling said shafts for co-rotation.

15. The brake release apparatus according to claim 13 wherein said clutch means includes a disc clutch coupling said shaft to said bellcrank.

16. The brake release apparatus according to claim 13 including a control system connected to said actuating means and being responsive to an input signal representing a speed of the elevator drive machine for operating said actuating means to move said clutch means to the disengaged position.

17. The brake apparatus to claim 13 wherein said brake releasing means is a cable.

18. The brake release apparatus according to claim 13 wherein said actuating means is a solenoid.

19. The brake release apparatus according to claim 18 including a control system connected to said solenoid and being responsive to an input signal representing a speed of an elevator drive machine associated with said elevator drive machine brake for automatically operating said solenoid to move said clutch means to the disengaged position.

* * * * *